(12) United States Patent
Lake et al.

(10) Patent No.: US 8,876,087 B1
(45) Date of Patent: Nov. 4, 2014

(54) WATER TANK SYSTEM

(76) Inventors: William M. Lake, Lapeer, MI (US);
Holly M. Lake, Lapeer, MI (US)

( * ) Notice: Subject to any disclaimer, the term of this patent is extended or adjusted under 35 U.S.C. 154(b) by 533 days.

(21) Appl. No.: 13/272,564

(22) Filed: Oct. 13, 2011

(51) Int. Cl.
*B01F 3/04* (2006.01)
*C02F 1/66* (2006.01)

(52) U.S. Cl.
CPC .................................. *C02F 1/66* (2013.01)
USPC .......................................... 261/74; 261/122.1

(58) Field of Classification Search
CPC ......... C02F 1/66; C02F 3/201; C12G 1/0206; C12H 1/00
USPC ................................................. 261/74, 122.1
See application file for complete search history.

(56) References Cited

U.S. PATENT DOCUMENTS

| | | | | |
|---|---|---|---|---|
| 2,023,153 A | * | 12/1935 | Stella | 217/105 |
| 2,181,839 A | * | 11/1939 | Tressler | 426/15 |
| 3,169,524 A | * | 2/1965 | Langevin | 128/200.21 |
| 4,717,031 A | * | 1/1988 | Hewson | 215/384 |
| 4,784,765 A | | 11/1988 | Cohen | |
| 4,842,869 A | * | 6/1989 | Forino | 426/8 |
| 5,306,511 A | | 4/1994 | Whang | |
| 5,378,480 A | | 1/1995 | Carieri | |
| 5,587,191 A | | 12/1996 | Donsbach et al. | |
| 6,017,447 A | | 1/2000 | Wright et al. | |
| 6,063,295 A | | 5/2000 | Williams | |
| 6,149,804 A | | 11/2000 | Chung et al. | |
| 6,572,902 B2 | | 6/2003 | Abramowitz et al. | |
| 6,786,475 B2 | * | 9/2004 | Salter et al. | 261/62 |
| 6,800,257 B1 | * | 10/2004 | Kuriyama et al. | 422/186.3 |
| 6,814,992 B2 | * | 11/2004 | Pazik et al. | 426/231 |
| 6,874,770 B2 | * | 4/2005 | Torkaman | 261/130 |
| D535,558 S | | 1/2007 | Kehoe et al. | |

* cited by examiner

*Primary Examiner* — Charles Bushey

(57) ABSTRACT

A water tank system having a tank with an inner cavity adapted to hold water, with a filling aperture in a top surface of the tank and a spout is in a first side near a bottom surface, with an air pump external to the tank, an air stone in the inner cavity of the tank which is connected to the air pump via a tube, the air stone is adapted to gradually diffuse oxygen into the water in the tank, and an air water trap that is S-shaped and generally hollow and has an open first end and an open second end, the first end penetrates the top surface of the tank, the air water trap allows condensation to collect and air to be exhausted from the tank.

4 Claims, 3 Drawing Sheets

(ISO View)

(ISO View)

(Side View)

(Front View)

(Top View)

(Bottom View)

WATER TANK SYSTEM

FIELD OF THE INVENTION

The present invention is directed to a water tank system, more particularly to a water tank system that oxygenates the water and raises the pH of the water.

BACKGROUND OF THE INVENTION

Many individuals desire healthier and cleaner drinking water. The present invention features a novel water tank system. The system of the present invention oxygenates the water and changes the pH to a more alkaline pH.

SUMMARY

The present invention features a water tank system. In some embodiments, the water tank system comprises a tank having an inner cavity adapted to hold water, wherein a filling aperture is disposed in a top surface of the tank and a spout is disposed in a first side of the tank near a bottom surface; an air pump external to the tank; an air stone disposed in the inner cavity of the tank, the air stone is connected to the air pump via a tube, the air stone is adapted to gradually diffuse oxygen into the water in the tank; and an air water trap, the air water trap is S-shaped and generally hollow and has an open first end and an open second end, the first end penetrates the top surface of the tank, the air water trap allows condensation to collect and air to be exhausted from the tank.

In some embodiments, the system further comprises a cap removably attached to the filling aperture. In some embodiments, the system further comprises a footing disposed on the bottom surface of the tank.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
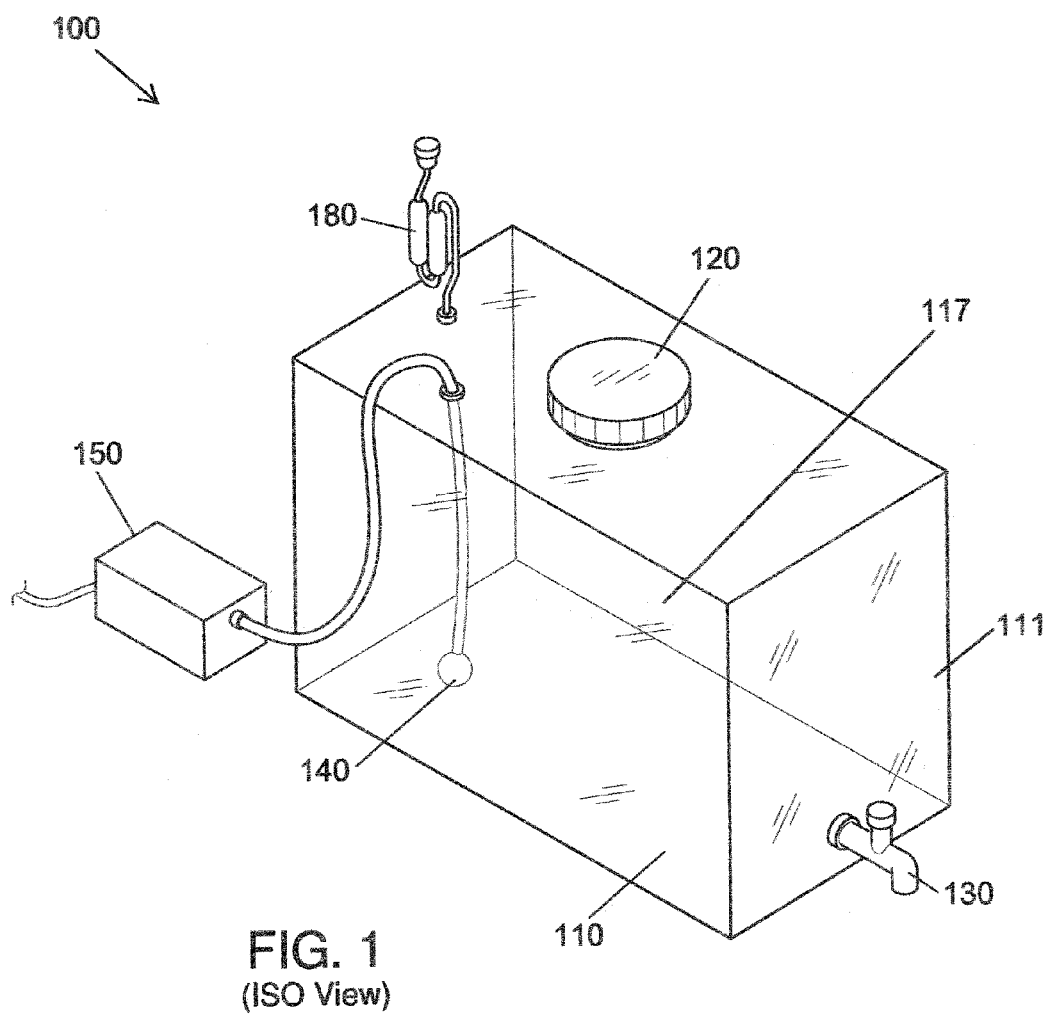
FIG. 1 is a perspective view of the system of the present invention.
Figure 2:
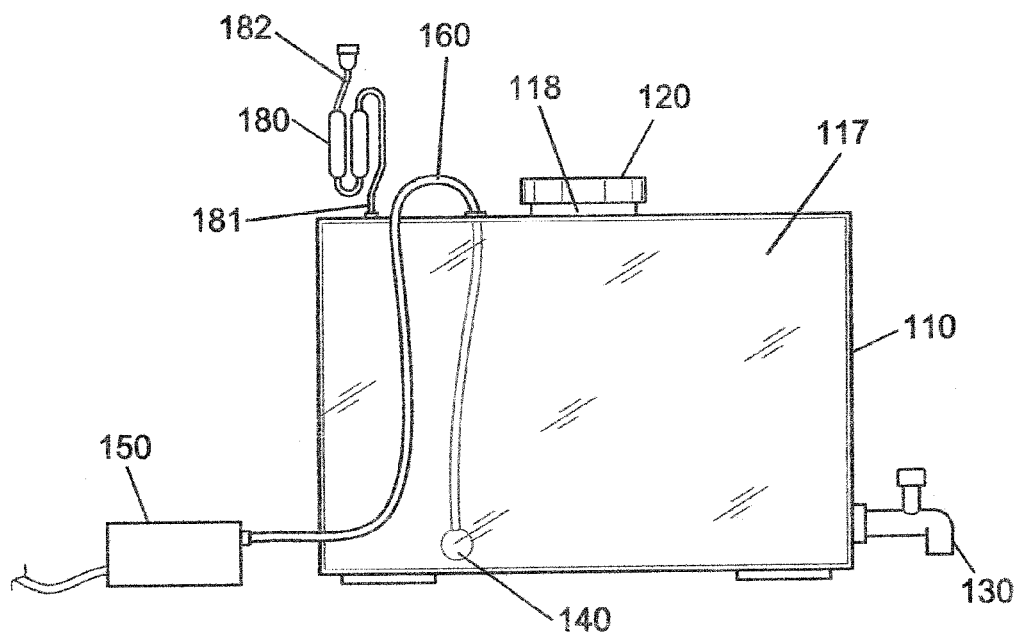
FIG. 2 is a side view of the system of the present invention.
Figure 3:
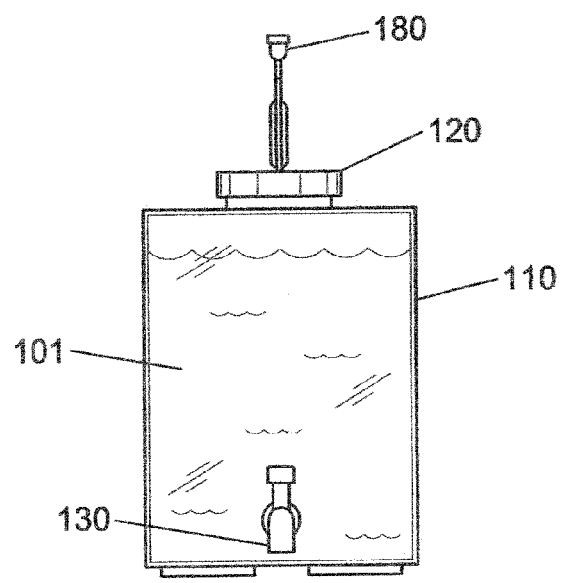
FIG. 3 is a front view of the system of the present invention.
Figure 4:
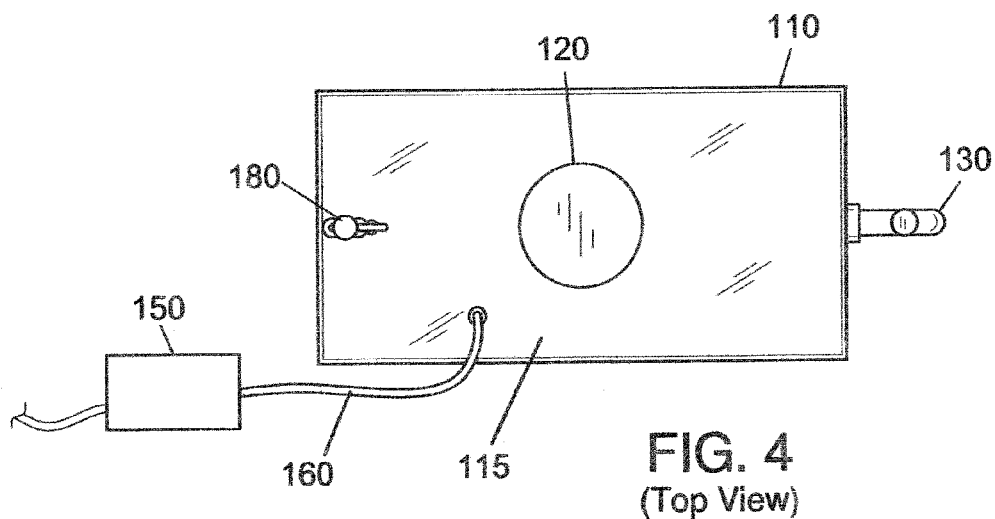
FIG. 4 is a top view of the system of the present invention.
Figure 5:
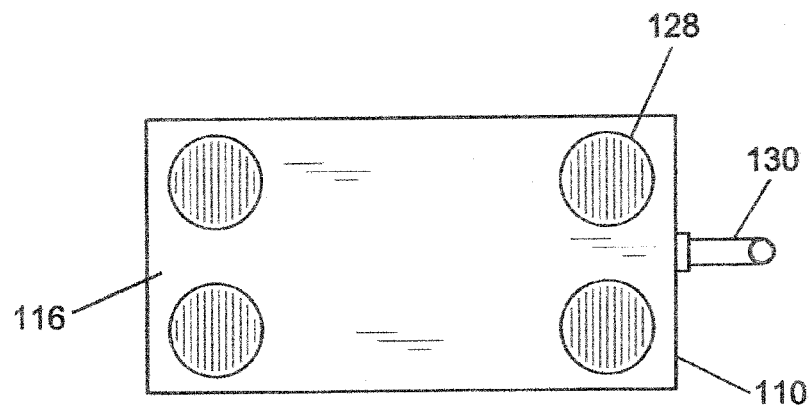
FIG. 5 is a bottom view of the system of the present invention.

Referring now to FIG. 1-5, the present invention features a water tank system 100. The system 100 of the present invention oxygenates the water and changes the pH to a more alkaline pH.

The system 100 of the present invention comprises a tank 110 having an inner cavity 117 adapted to hold water 101 (or other liquids if desired). A filling aperture 118 is disposed in the top surface 115 of the tank 110. The filling aperture 118 provides access to the inner cavity 117 of the tank 110 so that the tank 110 can be filled. A cap 120 is removably attached to the filling aperture 118.

A spout 130 is disposed in the first side 111 of the tank 110 (e.g., near the bottom surface 116). The spout 130 is adapted to regulate dispensing of water 101 from the tank 110. Spouts 130 are well known to one of ordinary skill in the art.

In some embodiments, one or more footings 128 are disposed on the bottom surface 116 of the tank 110. Footings 128 are well known to one of ordinary skill in the art. The footings 128 can help prevent the tank 110 from slipping.

The system 100 further comprises an air stone 140 disposed in the inner cavity 117 of the tank 110 (e.g., near the bottom surface 116). Air stones are well known to one of ordinary skill in the art. The air stone 140 is adapted to gradually diffuse oxygen into the water 101 in the tank 110.

The system 100 further comprises an air pump 150. A tube 160 connects the air pump 150 to the air stone 140. The air pump 150 functions to provide air (e.g., oxygen) to the air stone 140. The air pump 150 is external to the tank 110. The tube 160 penetrates the tank 110 (e.g., the top surface 115).

The system 100 further comprises an air water trap 180. The air water trap 180 is S-shaped and has a first end 181 and a second end 182. The first end 181 penetrates the top surface 115 of the tank 110. The S-shape of the air water trap 180 allows condensation to collect while allowing air to be exhausted from the tank 110.

The system 100 of the present invention may be constructed from a variety of materials and in a variety of sizes. For example, in some embodiments, the system 100 is constructed from a material comprising BPA-free plastic. In some embodiments, the air stone is a ceramic air stone. The system 100 of the present invention is not limited to the aforementioned materials. In some embodiments, the tank 110 is between about 9 to 10 inches in height as measured from the top surface 115 to the bottom surface 116. In some embodiments, the tank 110 is between about 6 to 10 inches in height as measured from the top surface 115 to the bottom surface 116. In some embodiments, the tank 110 is more than about 10 inches in height as measured from the top surface 115 to the bottom surface 116.

As used herein, the term "about" refers to plus or minus 10% of the referenced number. For example, an embodiment wherein the tank 110 is about 10 inches in length includes a tank 110 that is between 9 and 11 inches in length.

The disclosures of the following U.S. Patents are incorporated in their entirety by reference herein: U.S. Pat. No. 4,784,765; U.S. Pat. No. 5,306,511; U.S. Pat. No. 5,378,480; U.S. Pat. No. 5,587,191; U.S. Pat. No. 6,017,447; U.S. Pat. No. 6,063,295; U.S. Pat. No. 6,149,804; U.S. Pat. No. 6,572,902; U.S. Design Pat. No. D535558.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A water tank system (100) comprising:
   (a) a tank (110) having an inner cavity (117) adapted to hold water (101), wherein a filling aperture (118) is disposed in a top surface (115) of the tank (110) and a spout (130) is disposed in a first side (111) of the tank (110) near a bottom surface (116);
   (b) an air pump (150) external to the tank (110);
   (c) an air stone (140) disposed in the inner cavity (117) of the tank (110), the air stone (140) is connected to the air pump (150) via a tube (160) that penetrates the top surface (115) near the filling aperture (118), the air stone (140) is adapted to gradually diffuse oxygen into the water (101) in the tank (110); and
   (d) an air water trap (180) the air water trap (180) S-shaped and generally hollow and has an open first end (181) and an open second end (182), the first end (181) penetrates the top surface (115) of the tank (110), the air water trap (180) allows condensation to collect and air to be exhausted from the tank (110).

2. The system (100) of claim 1 further comprising a cap (120) removably attached to the filling aperture (118).

3. The system (100) of claim 1 further comprising a footing (128) disposed on the bottom surface (116) of the tank (110).

4. A water tank system (100) consisting of:
   (a) a tank (110) having an inner cavity (117) adapted to hold water (101), wherein a filling aperture (118) is disposed in a top surface (115) of the tank (110) and a spout (130) is disposed in a first side (111) of the tank (110) near a bottom surface (116);
   (b) an air pump (150) external to the tank (110);
   (c) an air stone (140) disposed in the inner cavity (117) of the tank (110), the air stone (140) is connected to the air pump (150) via a tube (160) that penetrates the top surface (115) near the filling aperture (118), the air stone (140) is adapted to gradually diffuse oxygen into the water (101) in the tank (110); and
   (d) an air water trap (180), the air water trap (180) is S-shaped and generally hollow and has an open first end (181) and an open second end (182), the first end (181) penetrates the top surface (115) of the tank (110), the air water trap (180) allows condensation to collect and air to be exhausted from the tank (110).

\* \* \* \* \*